(12) United States Patent
Schuh

(10) Patent No.: US 6,643,946 B1
(45) Date of Patent: Nov. 11, 2003

(54) BEARING CLEARANCE DETECTOR

(76) Inventor: David N. Schuh, R.R. 4, Calgary, Alberta (CA), T2M 2L4

( * ) Notice: Subject to any disclaimer, the term of this patent is extended or adjusted under 35 U.S.C. 154(b) by 0 days.

(21) Appl. No.: 08/190,485

(22) Filed: Feb. 2, 1994

(51) Int. Cl.[7] .................................. G01B 5/14
(52) U.S. Cl. ..................... 33/605; 33/DIG. 15; 33/833
(58) Field of Search .......................... 33/603, 604, 605, 33/833, DIG. 2, DIG. 15, DIG. 17

(56) References Cited

U.S. PATENT DOCUMENTS

| | | | |
|---|---|---|---|
| 1,758,271 A | * 5/1930 | Zitzman | 33/DIG. 15 |
| 3,056,280 A | * 10/1962 | Brewer et al. | 33/DIG. 2 |
| 3,577,642 A | * 5/1971 | Tripoli | 33/DIG. 2 |
| 4,928,400 A | 5/1990 | Schuh | 33/605 |

* cited by examiner

Primary Examiner—G. Bradley Bennett

(57) ABSTRACT

An operating apparatus and method for a bearing clearance detector. The apparatus is arranged such that an air pressure and vacuum may be applied to a probe inserted into the cylinder of an engine. The operator may apply the vacuum in incremented steps while observing the readings of a micrometer mounted on the probe. The "steps" required for proper bearing clearance readings are readily observed.

5 Claims, 3 Drawing Sheets

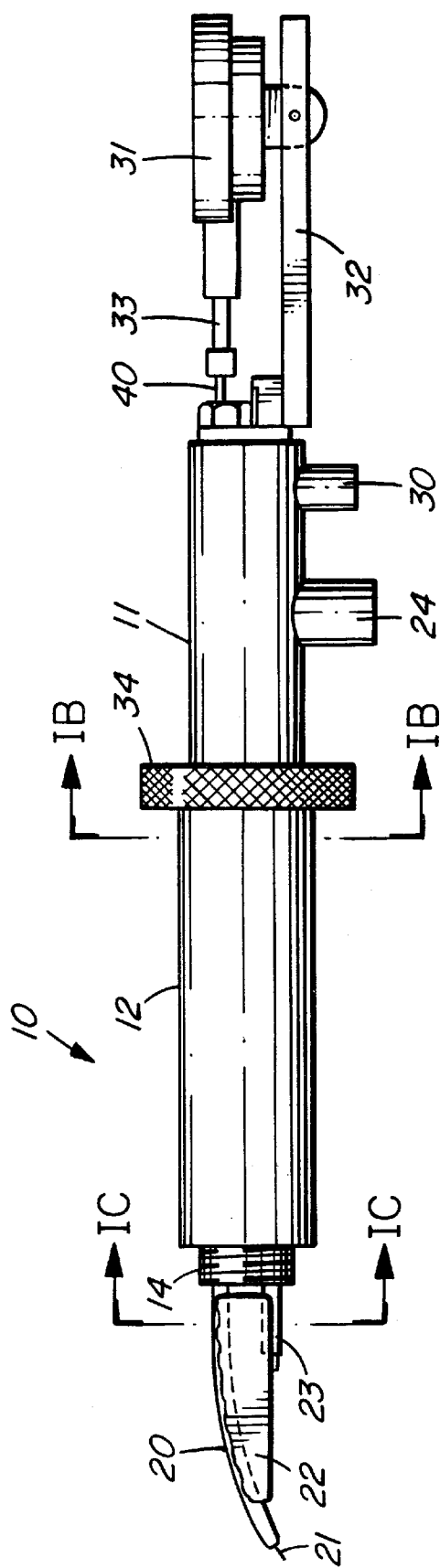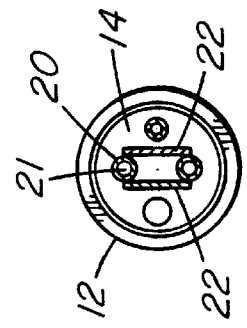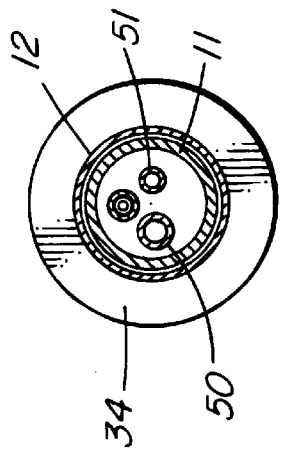

BEARING CLEARANCE DETECTOR

INTRODUCTION

This invention relates to a bearing clearance detector or probe and, more particularly, to a method and apparatus for facilitating the determination of engine bearing clearances without the necessity of disassembling the engine.

BACKGROUND OF THE INVENTION

In our U.S. Pat. No. 4,928,400 entitled BEARING CLEARANCE DETECTOR, a probe is described and illustrated which is used for the purpose of determining the clearances between initially, a piston and its piston rod and, secondly, between the piston rod and the crank pin of a crank shaft without the necessity of disassembling the engine. In order to obtain such clearances, a probe is inserted through a cylinder hole allowing access to the piston such as a spark plug, injector, airstart valve or fuel gas valve hole. An incremental vacuum sufficient to raise the piston relative to the piston rod is applied to the probe and the distance through which the piston moves as, measured by a measuring device such as a dial indicator. Thereafter, a further vacuum is applied to the probe sufficient to lift the piston and the piston rod relative to the crank pin. This second distance through which the piston and piston rod move is also measured. The two distances are readily obtained without disassembling the engine.

In the aforementioned measurement, however, it is necessary that the "step" between the two measured distances be readily observable in order that the distance moved by the piston relative to the piston rod and the distance moved by the piston and piston rod relative to the crank pin can be accurately differentiated. In utilizing the probe, a vacuum line is connected directly to the instrument and the measurement device, conveniently a dial indicator. The operator of the line through which the vacuum is applied is, however, separated from the instrument itself with the result that two man operation and coordination between them was necessary. This is an unnecessarily expensive undertaking and, in addition, because of the lack of "hands on" operation between the individual reading the gauge and the individual operating the vacuum or air pressure line, it is difficult to tell precisely when the "step" or second incremental movement of the piston occurred. The eventual result was correct but unnecessary time was consumed.

The necessity for accurate coordination between vacuum and pressure application and the reading of the dial indicator is particularly important in vee-type engines having master and link rods. This is so because one side of the engine has no inspection openings or "doors" and inspection of the link rod bearings is impossible without major dismounting of the engine.

SUMMARY OF THE INVENTION

According to one aspect of the invention, there is provided a bearing clearance detector operable to be inserted into a hole of the cylinder of an engine, a distance measuring device operably connected to said detector and operating apparatus interposed between an air supply line connected to said detector and a source of air pressure supplied to said operating apparatus, said operating apparatus including means to incrementally apply a vacuum to said cylinder of said engine while allowing an operator of said incremental application means to observe the distance measuring device connected to said detector.

According to a further aspect of the invention, there is provided a method of applying a vacuum or air pressure to a bearing clearance detector comprising applying air pressure to said detector, applying increasing vacuum to said detector while observing the distance indicated on a measurement device operably connected to said detector.

BRIEF DESCRIPTION OF THE SEVERAL VIEWS OF THE DRAWINGS

A specific embodiment of the invention will now be described, by way of example only, with the use of drawings in which:

FIG. 1A is a side view of a bearing clearance detector without the pressure of the operating apparatus connected thereto;

FIG. 1B is a section view taken along IB—IB of FIG. 1A;

FIG. 1C is a sectional view taken along IC—IC of FIG. 1A;

DESCRIPTION OF SPECIFIC EMBODIMENT

Figure 2:
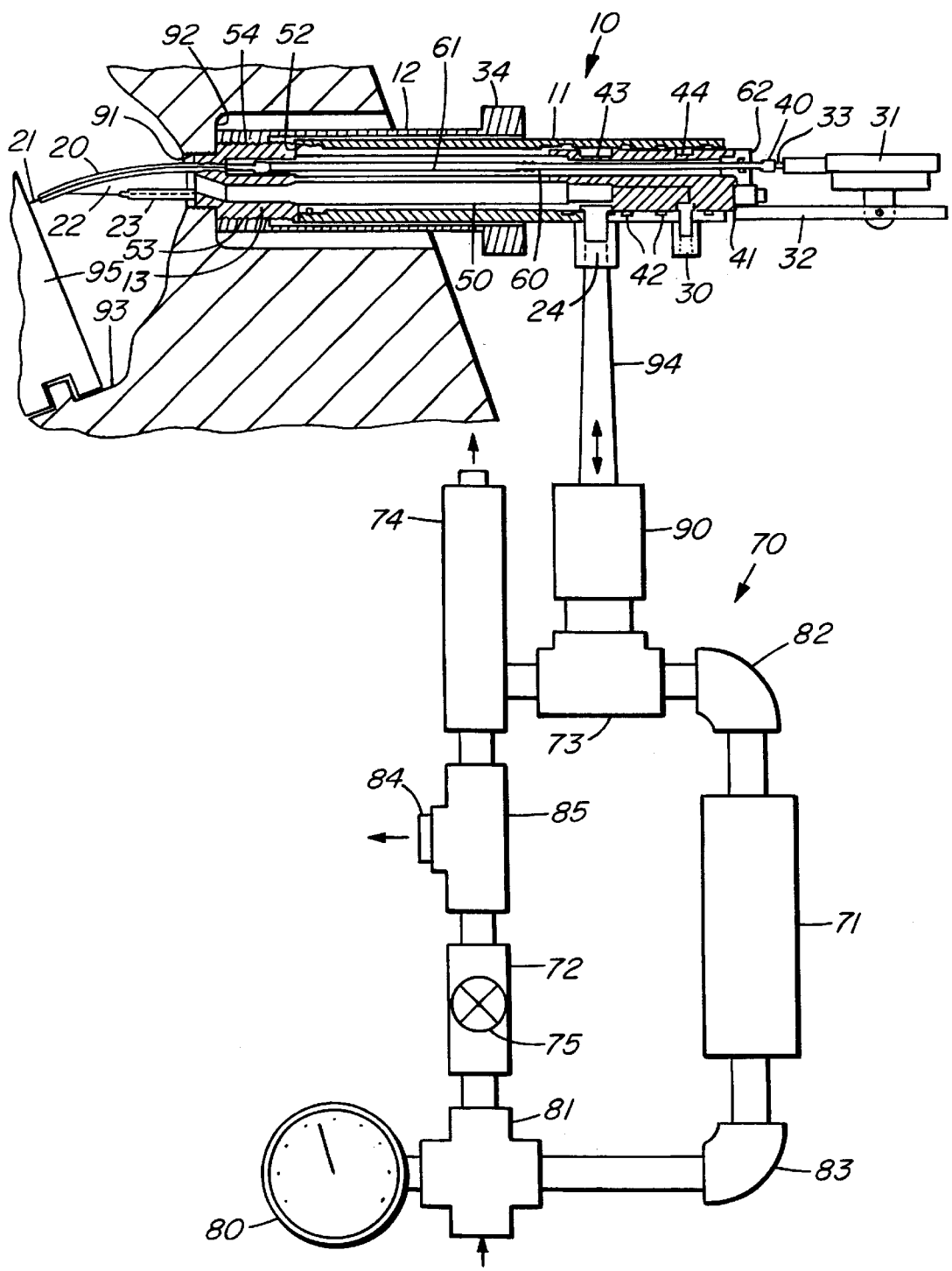
FIG. 2 is a diagrammatic view of the operating apparatus interposed between the air supply and the bearing clearance detector.

Referring to the drawings, a bearing clearance detector is generally illustrated at 10. It comprises tubular casing 11 within a sleeve 12. A plug 13 (FIG. 2) has a threaded front end 14 extending outwardly from the sleeve 12 and a guide 20, conveniently taking an arcuate configuration, extends outwardly therefrom with a probe 21 movable therein. Guide 20 is held in position by reinforcing plates 22 extending between the arcuate guide sleeve 20 and a tube 23 also connected to the plug 13, all as will be explained.

An air inlet 24 allows air under pressure or a vacuum to enter the casing 11 and an oil inlet 30 likewise allows ingress of oil to the casing 11.

A distance measuring device, conveniently a dial indicator 31 is connected to a bracket 32 which extends from the end of the tubular casing 11. Gauge 31 has a spring influenced and movable pin 33 which extends from gauge 31 and which is in contact with a plunger 40 FIG. 2 which extends from and is movable with the tubular casing 11 and sleeve 12 of probe 10.

A knurled flange 34 is connected directly to the outer circumference of sleeve 12. Flange 34 is operable to rotate the sleeve 12 relative to the plug 13 as will be explained.

Referring now to FIG. 2, a plug 41 is sealingly mounted in casing 11 by O-rings 42. Plug 41 has two annular passageways 43, 44 which accommodate air or vacuum entering air inlet 24 and oil entering oil inlet 30, respectively. Two elongate tubes 50, 51 FIG. 1B for carrying the air or vacuum and oil, respectively, as also illustrated in FIG. 1A, extend from the plug 41 and are operable to be connected with the annular passageways 43, 44.

The casing 11 extends axially within sleeve 12 and has an internally threaded portion 52 which mates, with a corresponding externally threaded periphery 53 on plug 13. The externally threaded portion of plug 13 also extends down and threadedly engages with an internally threaded portion 54 of sleeve 12. Tubes 50, 51 extend through the plug 13 and are operable to pass the air or vacuum and oil, respectively, to the cylinder of the engine as will be explained and as is illustrated in FIG. 1B. A helical spring 60 extends between a shoulder 61 on plunger 40 and a bushing 62 mounted in plug 41 to maintain plunger 40 in contact with probe 21.

The operating apparatus according to the invention is generally illustrated at 70. It comprises a plurality of operating components, namely a flow meter 71, a venturi motive air shutoff and vacuum control 72, a three way valve 73 operable to select either the vacuum or air pressure mode and a venturi 74 operable to create the vacuum which is applied to the bearing clearance detector 10 by valve 73.

A pressure gauge 80 is operably mounted to a cross piece 81 which is attachable to a compressed air supply providing, in this instance, approximately 60 cfm of air at 90 psi. Elbows 82, 83 are connected between the cross piece 81 and the flow meter 71 and the three way valve 73 and the flow meter 71, respectively. A T-piece 85 is provided between the venturi 74 and the air shutoff and vacuum valve 72. T-piece 85 is intended for use in Vee-type engines as will be explained and has a removable plug 84 mounted therein. A quick coupler 90 is connected to the three way valve 73 and is adapted to be connected to and removed from the bearing clearance detector 10.

OPERATION

In operation and assuming that the bearing clearances of interest are those of an ordinary in-line gasoline type engine, the threaded front end 14 of plug 13 of the bearing clearance detector 10 is inserted into the threaded spark plug opening 91 of the engine and is rotated until the axis of the probe 21 is parallel to the axis of the cylinder which is being tested. It would, of course, also be possible to insert the threaded end 14 of plug 13 into the injector hole of a diesel engine and plug 13 can be of various sizes in order to fit the various openings into which the threaded end 14 is intended to be inserted.

The sleeve 12 will then be rotated by the use of knurled flange 34 until it contacts the gasket seat in the engine block 92 as illustrated in FIG. 2. This will maintain the detector 10 in its proper position and prevent movement of the probe during testing.

The operating apparatus 70 is then connected to the air inlet duct 24 by way of hose 94 extending between the quick coupler 90 and the air inlet duct 24. The cross piece 81 is connected to the compressed air supply (not shown) and, following such connection, the pressure gauge 80 is checked to ensure that the pressure is within the required range.

Initially, three way valve 73 and vacuum valve 72 are operated to select the vacuum mode or to apply air pressure to the detector 10. Air pressure will flow through elbow 83, flow meter 71, elbow 82 and three way valve 73 to enter the bearing clearance detector 10. The air pressure will enter the annular passageway 43 of plug 41 and, thence, flow through tube 50 and enter the cylinder 93. The piston 95 will be initially located in the top dead center position and the air pressure entering the cylinder 93 through tube 50 will remove any downwards movement in the piston 95. The dial indicator 31 will then be read by the operator.

Three way valve 73 will then be operated so that the vacuum test can be conducted with the vacuum applied being manually and incrementally adjustable by the air shutoff and vacuum control 72 which vacuum is created by the air flow through venturi 74. Sufficient vacuum will be provided by rotation of the handle 75 of control 72 to the detector 10 to raise the piston 95 relative to the piston rod (not shown). This vacuum is applied in an amount sufficient to raise the piston 95 but not to raise the piston rod when any play between the wrist pin of the piston 95 and the piston rod is removed.

With this vacuum applied, the operator will read dial indicator 31 and the difference between the first two readings will give a value for piston lift or play between the connecting rod and the piston 95 and, therefore, this play can be compared with the appropriate clearance to determine if bearing replacement or engine rebuild is necessary.

Thereafter, the vacuum applied through quick coupler 90 to air inlet duct 24 will be increased by rotating handle 75 so that the piston 95 and its connecting rod are lifted together. The vacuum is increased until the increasing measurement value taken from dial indicator 31 is constant. The difference between the second and third readings will, of course, give the value for clearance between the connecting rod and the crank pin of the crankshaft. Again, this value may be compared to the specified clearance value to determine whether engine rebuild or bearing replacement is necessary.

Thus, a single operator can perform the bearing analysis and may manually control the application of the vacuum to the air inlet 24 of the probe 10 while simultaneously and readily observing the two "step" readings which will be taken from dial indicator 31.

Figure 3:
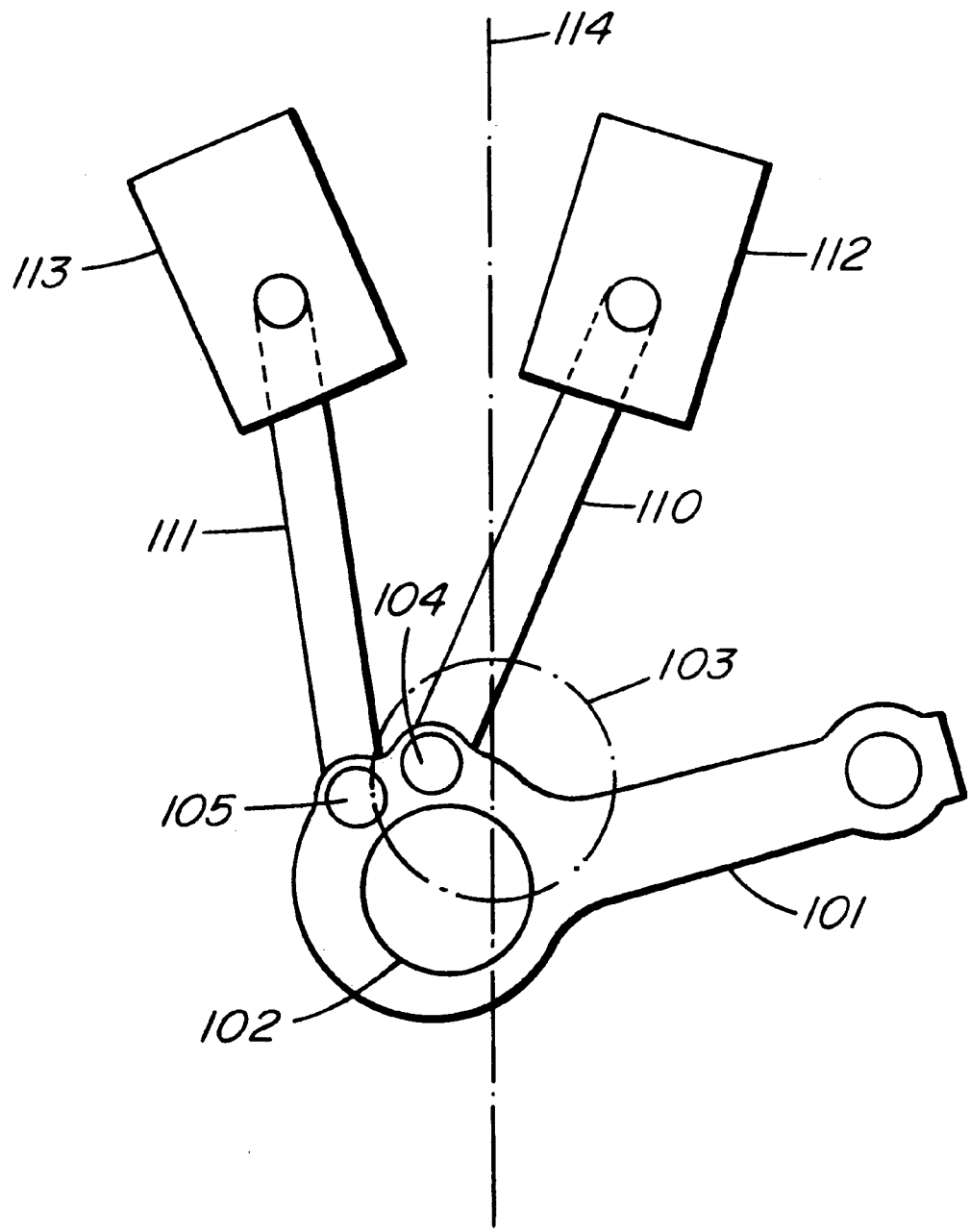
FIG. 3 is a diagrammatic view of a Vee-type master-link rod engine which utilizes the operating apparatus according to the invention.

It may also be desirable to measure bearing clearances in a V-type engine having a master rod 101 as illustrated in FIG. 3. In engines of this nature, the master rod 101 reciprocates on a crank pin 102 of crank shaft 103 as is usual. Link pins 104, 105 however, are mounted on the master rod 101 and link rods 110, 111 are connected between the link pins 104, 105 and pistons 112, 113, respectively, and reciprocate with the pistons 112, 113.

To measure the play between, first, the piston 112 and its respective link rod 110 and, secondly, between the link rod 110 and the link pin 104 and thirdly, between the master rod 101 and the crank pin 102 to which it is connected, a probe 10 is inserted in the cylinder carrying the piston 112 in a typical mounting arrangement as is illustrated in FIG. 2. However, a second vacuum will also be created by connecting the T-piece 85 to a second venturi (not illustrated) by removing plug 84 and connecting the air pressure source to the venturi mounted on the cylinder containing piston 113. This may be done by connecting the vacuum from the venturi to the spark plug adapter or other convenient aperture in the second cylinder.

To measure the play between the piston 112 and its link rod 110, vacuum will be applied in an incremental manner by rotating handle 75 in precisely the same manner as was explained in connection with the FIG. 2 embodiment. Likewise, the same procedure will be followed to determine the play between the link rod 110 and the link pin 104 of the master rod 101.

However, in order to measure the play between the master rod 101 and the crank pin 102, it is necessary to raise the master rod 101, the two link rods 110, 111 and the two pistons 112, 113 connected to the link rods 110, 111. In this measurement, the master rod 101 will be positioned so that the link rods 110, 111 are symmetrically located on each side of the axis 114 extending through the axis of the crankshaft 103.

The vacuum is then applied to both pistons 112, 113 by the operator manually rotating the handle 75 and measuring the incremental distance of movement of the master rod 101 with respect to the crankshaft 102. The relative movement of the master rod 101 to the crankshaft 102 is measured with the dial indicator 80 mounted on the crankshaft 102, monitoring the movement of the master rod 101.

While specific embodiments of the invention have been disclosed, it should be understood that such descriptions are specific examples and illustrative of the invention only. They should not be construed as limiting the scope of the invention as defined in accordance with the accompanying claims.

What is claimed is:

1. A bearing clearance detector operable to be inserted into a hole giving access to the cylinder of an engine, a distance measuring device operably connected to said detector and adapted to be in contact with a piston in said cylinder, operating apparatus interposed between an air supply line connected to said detector and a source of air pressure supplied to said operating apparatus, said operating apparatus including means operated by an operator for incrementally applying a vacuum to said cylinder of said engine while allowing said operator of said incremental application means to simultaneously observe the distance measuring device connected to said detector, said operating apparatus being connected to and immediately adjacent to said distance measuring device.

2. A bearing clearance detector as in claim 1 wherein said incremental application means is a handle.

3. A bearing clearance detector as in claim 2 wherein said distance measuring device is a dial indicator.

4. A method of applying a vacuum or air pressure to a bearing clearance detector by an operator, said method comprising applying air pressure to said detector, applying increasing vacuum to said detector in incremental steps, and observing the incremental distances of said steps indicated on a measurement device operably connected to said detector and located immediately adjacent thereto, said method of applying air or air pressure being performed by a single operator, said operator observing said distance on said measurement device while simultaneously applying vacuum or air pressure to said detector.

5. A method of applying a vacuum or air pressure as in claim 4 wherein said observed distance is shown on a dial indicator.

\* \* \* \* \*